United States Patent
Lee et al.

(10) Patent No.: US 6,275,828 B1
(45) Date of Patent: Aug. 14, 2001

(54) METHOD OF PROVIDING PERSISTENCE TO OBJECT IN C++ OBJECT ORIENTED PROGRAMMING SYSTEM

(75) Inventors: Mi Young Lee; Ok Ja Cho; Dae Young Hur, all of Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 0 days.

(21) Appl. No.: 09/271,158

(22) Filed: Mar. 17, 1999

(30) Foreign Application Priority Data

Mar. 19, 1998 (KR) ............................................. 1998-09535

(51) Int. Cl.[7] ..................................................... G06F 12/00
(52) U.S. Cl. .......................... 707/103; 709/328; 709/312; 709/313; 709/315
(58) Field of Search ..................................... 707/103, 527; 717/1, 3–5, 10; 709/203, 219, 312–316, 328; 202/1–10, 100–102, 200–206, 527; 209/328

(56) References Cited

U.S. PATENT DOCUMENTS

| | | | |
|---|---|---|---|
| 5,247,669 | 9/1993 | Abraham et al. | 707/103 |
| 5,437,027 | 7/1995 | Bannon et al. | 707/103 |
| 5,590,327 | 12/1996 | Biliris et al. | 709/100 |
| 5,787,413 | * 7/1998 | Kauffmann et al. | 707/2 |
| 6,018,743 | * 1/2000 | Xu | 707/103 |
| 6,093,215 | * 7/2000 | Buxton et al. | 717/1 |
| 6,101,513 | * 8/2000 | Shakib et al. | 707/527 |

OTHER PUBLICATIONS

Rakesh Agrawal; Shaul Dar and Narian Gehani; THE O++ Database Programming Language; Implementation and Experience; 1993; pp. 1–10.

R.G.G. Cattel and Douglas K. Barry; The object Database Standard: ODMG 2.0; 1997; pp. 139–140.

Lee et al., "A dynamic memory measuring tool for C++ programs", Application Specific Systems and Software Engineering Technology, 2000, Proceedings, 3rd IEEE Symposium on, pp. 155–159, Mar. 2000.*

Lee et al., "Evaluation of a high–performance object reuse dynamic memory allocation policy for C++ programs", High Performance Computing in the Asia–Pacific Region, 2000, Proceedings, The Fourth International Conference/Exhibition on, pp. 386–391, May 2000.*

Al–Haddad et al., "Description of a new approach to object inheritance", Applied computing, 1990, Proceedings of the 1990 Symposium on, pp. 289–296, Apr. 1990.*

* cited by examiner

*Primary Examiner*—Thomas Black
*Assistant Examiner*—David Jung
(74) *Attorney, Agent, or Firm*—Antonelli, Terry, Stout & Kraus, LLP

(57) ABSTRACT

The present invention provides a method of providing persistence to objects which are to be created in a C++ application program, which may present to an user an interface for creating persistent objects with a same concept to that to create transient object in a C++ application program and method of implementing the interface. The present method includes overloading an object creation operator (new( )) into a persistent capable class (OM_POBJECT) as a C++ application program interface of an object oriented database system to use an object creation operator without parameter(OM_POBJECT::new( )), an object creation operator having persistence as parameters (OM_POBJECT::new(persistence)), and an object creation operator having persistence and typename parameters(OM_POBJECT::new(persistence, typename); and using a step of operating the persistence object creation operator and a step of operating a constructor function to support the interface.

8 Claims, 4 Drawing Sheets

METHOD OF PROVIDING PERSISTENCE TO OBJECT IN C++ OBJECT ORIENTED PROGRAMMING SYSTEM

BACKGROUND OF THE INVENTION

1. Field of the Invention

The present invention relates to a method of providing persistence to objects in a C++ object oriented programming system.

2. Description of the Prior Art

Generally, as a method of providing persistence to objects in a C++ object oriented programming system, one of the basic methods is one which allows an user to provide persistence to program objects by calling a store request at a file system or a database for program objects to what the user wants to provide persistence. However, this method has problems in consistency in data and its use because the user has to decide the time when the objects are stored and have the responsibility of loading the stored objects for use.

In order to solve these problems, there is proposed a method by which the system automatically stores and retrieves the objects, in which an object oriented programming system and a database system are integrated therein. For automatic storage and retrieval the system must be informed of the fact that subject objects require for this work. Here, according to the method of informing this, ease of use and portability of system differ.

The method of providing persistence to C ++ objects by integrating the C++ object oriented programming system and the database system includes mainly a method by which a C++ language itself is expanded to inform permanent objects; and a method by which a persistent capable class is defined and persistence is provided to only objects of its subclass.

C++ language expansion scheme has an advantage that it can provide persistence to objects orthogonally with the type. However, the method has a problem in portability because a preprocessor or a special compiler has to be provided so as to be operable in a general C++ programming environment.

A persistent capable class library scheme has problems that type and persistence are not orthogonal each other since it provides persistence to only objects belonging to specific classes. However, it does not pose a serious problem, since there is no possibility of storing objects in a state in which the classes are not in advance modeled into the database system in real world. Also, the persistent capable class library method includes a method of turning all the objects belonging to persistence classes into permanent objects; and a method by which they are selected to be provided as persistence objects or temporary objects by the user. The method of turning all the objects belonging to persistent classes into permanent objects has a problem in flexibility since it has to create another types if it wants them as temporary objects even though they have same types.

In the persistent capable class library scheme, the facilitation of use is greatly different depending on how the permanent objects and the temporary objects can be used without being perceived. At present, a C++ binding of ODMG being a group of commercial standard which is consisted of commercial object oriented database systems vendors, has proposed a following interface by which a persistent capable class is defined and both the temporary objects and the permanent objects can be created as objects belonging to the persistent capable class.

The interface can define specific class(hereinafter referred to as "POBJECT") as a persistent capable class, allow only the objects of classes inherited from the class to become persistence objects, and also require the permanent ability when objects are created. In order for the permanent object creation request to be used as a manner of using creation operators (hereinafter called new( )) used to create C++ objects, the interface overloads the operator new( ) so that it can be provided as a method of POBJECT as follows:

1) POBJECT::new( ) // creation of temporary objects
2) POBJECT::new(crowed object information, type names of objects to be created) // creation of permanent objects
3) POBJECT::new(database information, type names of objects to be created) // creation of persistence or temporary objects.

In a second interface, the crowed object information to be transmitted as a parameter is one for the storage position within the database of actually created objects, in which whether the parameter exists or not determines the persistence of the object. In a third interface, the database information parameter has a persistence flag, and creates a permanent object or a temporary object according to the persistence flag. In a C++ binding of ODMG, the proposed persistent object creation interface uses the class name following a new operator to decide the type of the created object when creating a temporary object, wherein the new operator for persistent object creation requires the type name of the object to be created as a parameter.

The C++ binding of ODMG only has proposed an user interface for a method of providing persistence to C++ application programming object, and did mention nothing about any method how it should be implemented. Though there is a commercial system which is said to be compatible for this standard proposal, any internal operation algorithm or any implementation of this has not been proposed.

SUMMARY OF THE INVENTION

It is an object of the present invention to solve the problems involved in the prior art, and to provide a method of providing persistence to objects in a C++ object oriented programming system capable of supplementing the interface proposed by the C++ binding of ODMG and of presenting a method of implementing it.

To achieve the above object, technology to provide persistence to objects in a C++ object oriented programming supplements the interface proposed by the C++ binding of ODMG being a commercial standard proposal and then presents the object creation operator new( ) by overloading it into the persistent capable class(below called OM_POBJECT) as follows:

1) OM_POBJECT::new( )
2) OM_POBJECT::new(persistence)
3) OM_POBJECT::new(persistence, type name)

The first new operator is a new operator which creates a temporary object, the second new operator decides persistence of objects by persistence parameter and the class of object created is decided by the class name following the new operator. The third new operator decides persistence of objects by persistence parameter. The class of objects created is first decided by a specified parameter type name (below called typename) and if it is a wrong class name, is decided by the class name following the new operator.

In the proposed object creation interface, all the objects of persistent capable classes can create both temporary object and persistence objects using a same interface, and also can create persistence objects without additionally specifying the class name of the objects if using the second interface. When the objects are created using the third interface, the third interface can implement OM_POBJECT class so that objects can be created even without a class structure definition statement The following internal algorithm is proposed which can consistently implement the above interface.

In C++ application program, when the new( ) to create persistence objects are called, objects must be created in the database as well within the memory so that they can be persistence after the program is finished. To create objects in the database means that class information for the objects to be created has to be informed. However, since the second new operator does not have the class name, information on this must be obtained otherwise. In C++ programming, since the information on class is usually hard to obtain when the new( ) is called, it is difficult to know to what class the object has to be created. Though a method to provide the class name is defined as a member function, since the method defined in the class can be called only after the object has been created, it will not be useful when the new( ) is called. Therefore, the present invention can create objects in the disk as well as the memory when the new( ) is called in a way that it employs constructor functions which are called among the methods at the first time, that is, being methods called when the objects are created at a point of user's view to get information on the class.

BRIEF DESCRIPTION OF THE DRAWINGS

The above object, and other features and advantages of the present invention will become more apparent by describing the preferred embodiment thereof with reference to the accompanying drawings, in which.

Similar reference characters refer to similar parts in the several views of the drawings.

DETAILED DESCRIPTION OF PREFERRED EMBODIMENT

One embodiment of the preferred embodiment of the present invention will be explained in detail by reference to the accompanying drawings.

Figure 1:
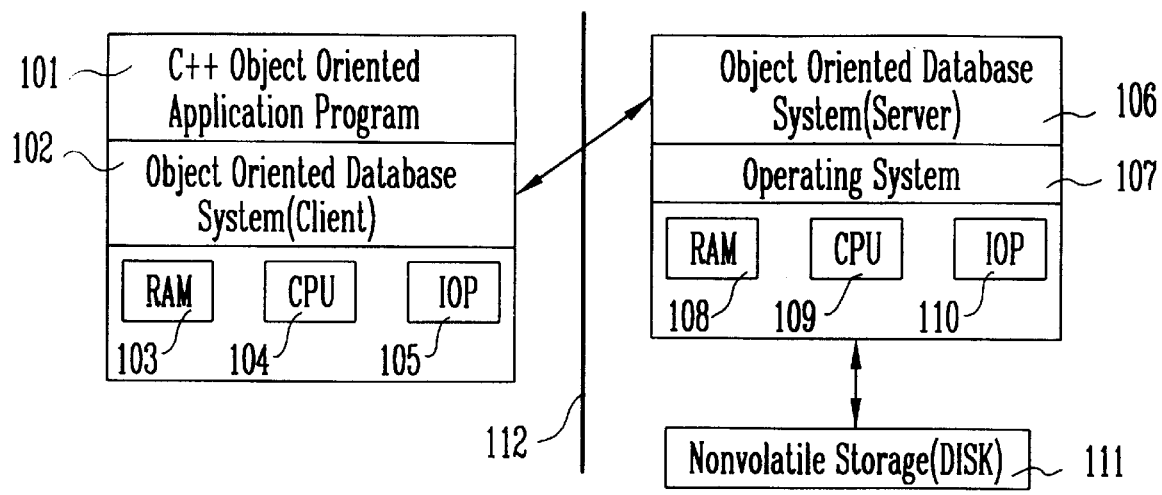
FIG. 1 shows a construction illustrating a computer system which is applicable to the present invention.

FIG. 1 shows a construction illustrating a computer system which is applicable to the present invention.

A computer system environment includes a RAM 103 of a main memory, a CPU 104 of a processor and an IOP 105 of input/output processor, in which a C++ object oriented application program 101 for creating persistence objects and a persistence providing system 102 that is provided as a library (which is located within the client as a part of the object oriented database) are integrated therein.

The request of the C++ application program which wants to create persistence objects is processed via a network 112 by an object oriented database system 106 which manages persistence objects in the DISK 111 of a nonvolatile storage with the help of an operating system 107, RAM 108, CPU 109 and IOP 110 in the server.

Figure 2:
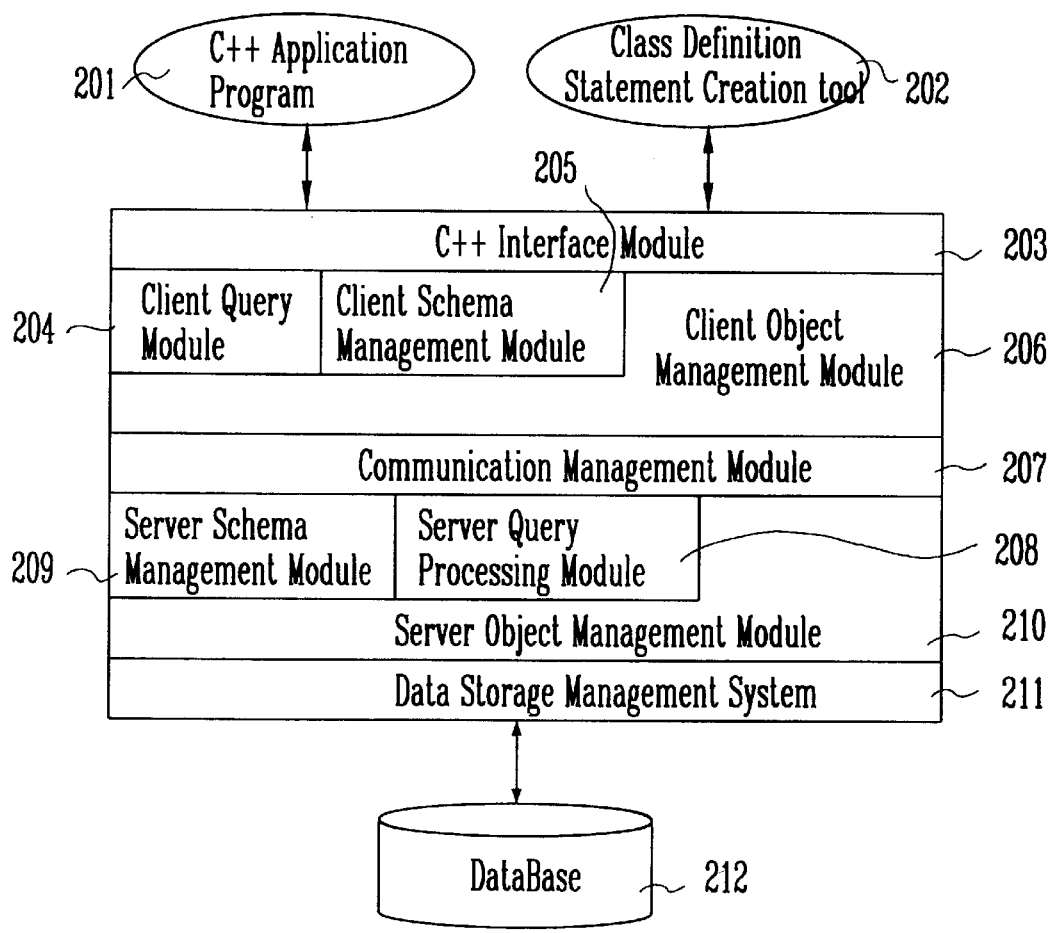
FIG. 2 shows a module construction of an object oriented database system in which the present invention is applicable.

FIG. 2 shows a module construction of the object oriented database system in which the present invention is applicable.

A C++ interface module 203 supports an application programming interface to be used in the C++ application program 201. A schema management modules 205 and 209 are responsible for schema management and authority management such as class definition and change. A client schema management module 205 serves to provide schema information. A server schema management module 209 functions to perform works necessary for actual schema management.

Object management modules 206 and 210 perform such functions as object management like creation, storage, deletion and change of objects; object identifier management; transformation between the main memory objects and the disk storage objects; cash support of the objects within the client memory, etc. The management for the objects stored at the disk is performed in the server object management module 210, and the management for transformation between the main memory objects/disk objects and the main memory objects management are responsible for the client object management module 206.

Query modules 204 and 208 support a query processing function.

A communication management module 207 is responsible for communication between the client and the server.

A data storage management system 211 stores and manages actual data into the database 212 stored at the disk of nonvolatile memory, and is responsible for actual access to the data which are requested by the server object management module 210.

A class definition statement creation tool 202 is a system which employs the functions of the object oriented database system to create C++ header files in which methods necessary to manage persistence object management are defined.

Figure 3:
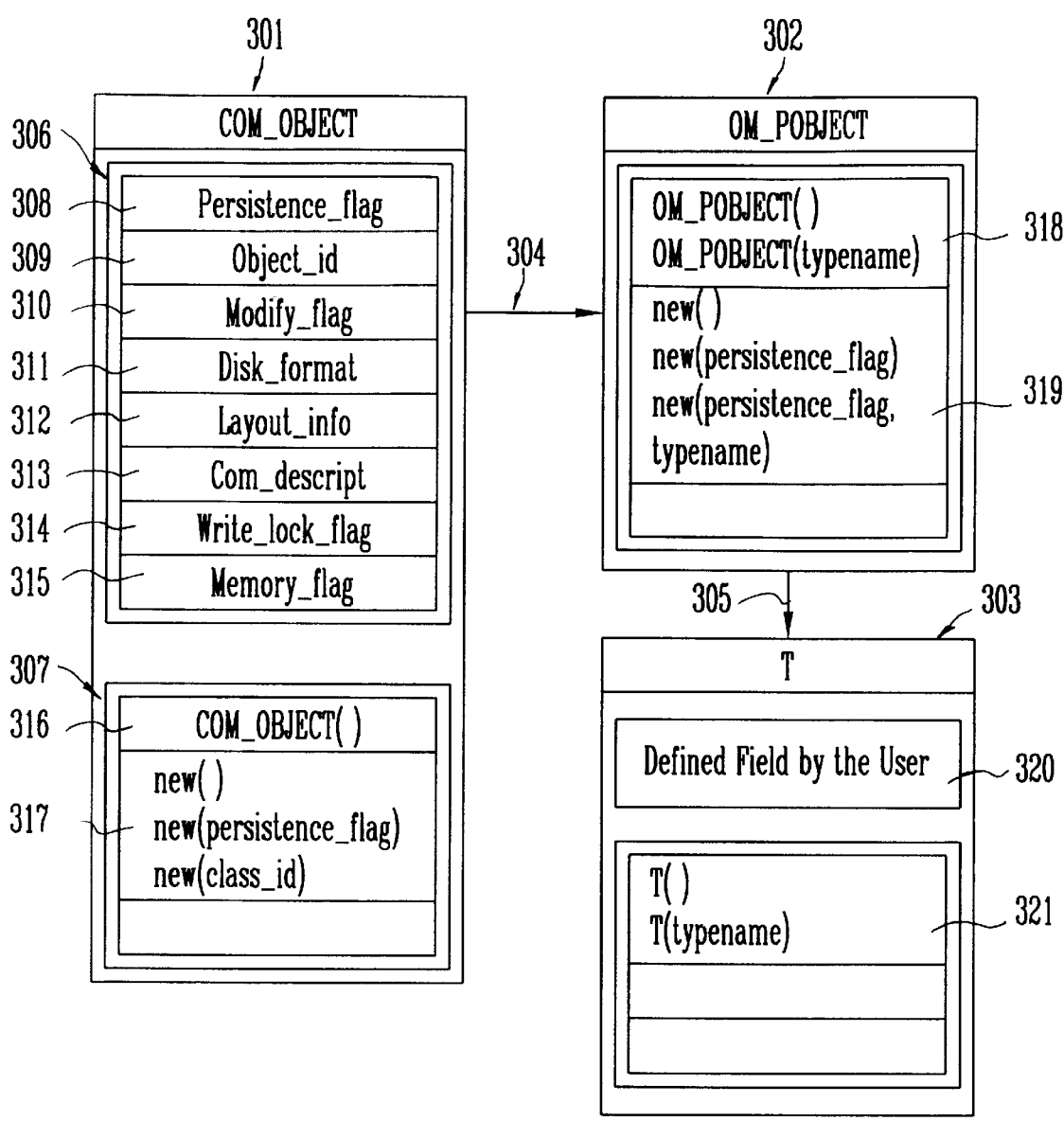
FIG. 3 shows a structure of class which is used the method of providing persistence to C++ objects according to the present invention, and their relationship.

The modules into which the technology implemented into the present invention is incorporated include the class definition statement creation tool 202, the C++ interface module 203, and the object management modules 206 and 210, which perform works with the help of other modules FIG. 3 shows a structure of class which is used in the method of providing persistence to C++ objects according to the present invention, and its relationship.

If the user wants to create persistence objects of a class called T in the C++ application program, the class T 303 must be a class 305 derived from OM_POBJECT which is the persistent capable class. OM-POBJECT is a class derived from a persistence management class 301 (hereinafter called COM_OBJECT), which is an internal implementation class which manages an actual persistence.

COM_OBJECT class is consisted of attributes 306 for storing information necessary for persistence management and methods 307 necessary for persistence management. The methods are divided into constructor methods, redefined operators and general methods. The methods related to the present invention are constructor methods 316 and redefined new operators 317, thus an explanation on the general methods will be omitted therefrom.

The attributes directly related to the method of providing persistence which the inventors desire to propose through the present invention includes a persistence flag 308 (hereinafter called Persistence_flag), an object identifier 309 (hereinafter called Object_id), a storage object 311 (hereinafter called Disk_format), a class structure information 312 (hereinafter called Layout_info) and a memory object flag 315 (hereinafter called Memory_flag).

The Persistence_flag 308 is a flag indicating whether the object is persistence, Object_id 309 is object identifiers, Disk_format 311 is a buffer containing the objects format stored at the database, and Layout_info 312 is a class structure information of the objects. The memory_flag 315 is a flag whether the present format of the object has been transformed into the format used in an application program.

In addition, there are a modify flag 310 (hereinafter called Modify_flag), an object descriptor 313 (hereinafter called Com_descript) and a write lock flag 314 (hereinafter called Write_lock_flag), all of which are information for managing object cash within the client of application program operating environment and also necessary for access control of persistence objects in an application program.

The Modify_flag 310 is a flag indicating whether the objects in the main memory of application program operating environment and the objects stored at the database are different or not, that is whether or not change has been made in the application program. The Write_lock_flag 314 is a flag for keeping consistency between the objects in the application program and the objects stored at the database. Com_descript 313 is a flag for managing access to persistence objects in the application program.

OM_POBJECT class 302 inherits the attributes and redefined new operator of COM_OBJECT class since it is derived 304 from COM_OBJECT 301. (in C++, the constructor method is a special method and thus is not inherited since it is not a subject for inheritance). OM_POBJECT 302 does not have any redefined attributes within itself and defines the constructor methods 318 and new operators 319 for persistence object management proposed by the present invention.

The T class 303 inherits the attributes of OM_POBJECT class and the new operators redefined within itself of OM_POBJECT class since it is a class 305 which is derived form OM_POBJECT class 302. Further, in the T class itself there are attributes 320 which are defined by the user and two constructor methods 321. These constructor methods must be defined since they are methods necessary for persistence management, and it is automatically defined in the class definition header file by the class definition statement creation tool.

In C++ program system, a procedure for performing the statement for creating general programming objects (that is, temporary objects);

Obj=new T( );

is described as follows.

First step; if there is any operator new( ) directly or indirectly defined to T, the operator new( ) of T is performed and if not, the operator new( ) defined in the program system is performed to allocate necessary size of memory to it. Here, the meaning of direct definition is said to be explicitly defined in the T class. Also the meaning of indirect definition is that the T class inherits it since it is defined at the super classes.

Second step; the constructor function called T( ) which is defined in the T class is performed to initialize the object. If the T class is the subclass which is derived from the class called S, the S( ) constructor is first performed and the T( ) constructor is then performed. If there are defined several constructors in the T class, constructors having corresponding interfaces are performed in consideration of the number of parameter, type, etc.

When the persistence objects are likewise created using the interface proposed by the present invention, if the class called T is a persistence class which is derived BJECT, the procedure for creating the persistent objects is as follows;

First step; since there is no new operator directly defined in the T class, the interfaces corresponding to three types of operators new( ) which are defined in OM_POBJECT class by the C++ programming system, are performed.

Second step; the corresponding constructor function called T( ) is performed by the C++ programming system.

In other words, creating persistence objects of T is performed according to the procedure which is defined in the operator new( ) defined in OM_POBJECT and also the constructor function of the T class. This will be explained in detail below.

Figure 4:
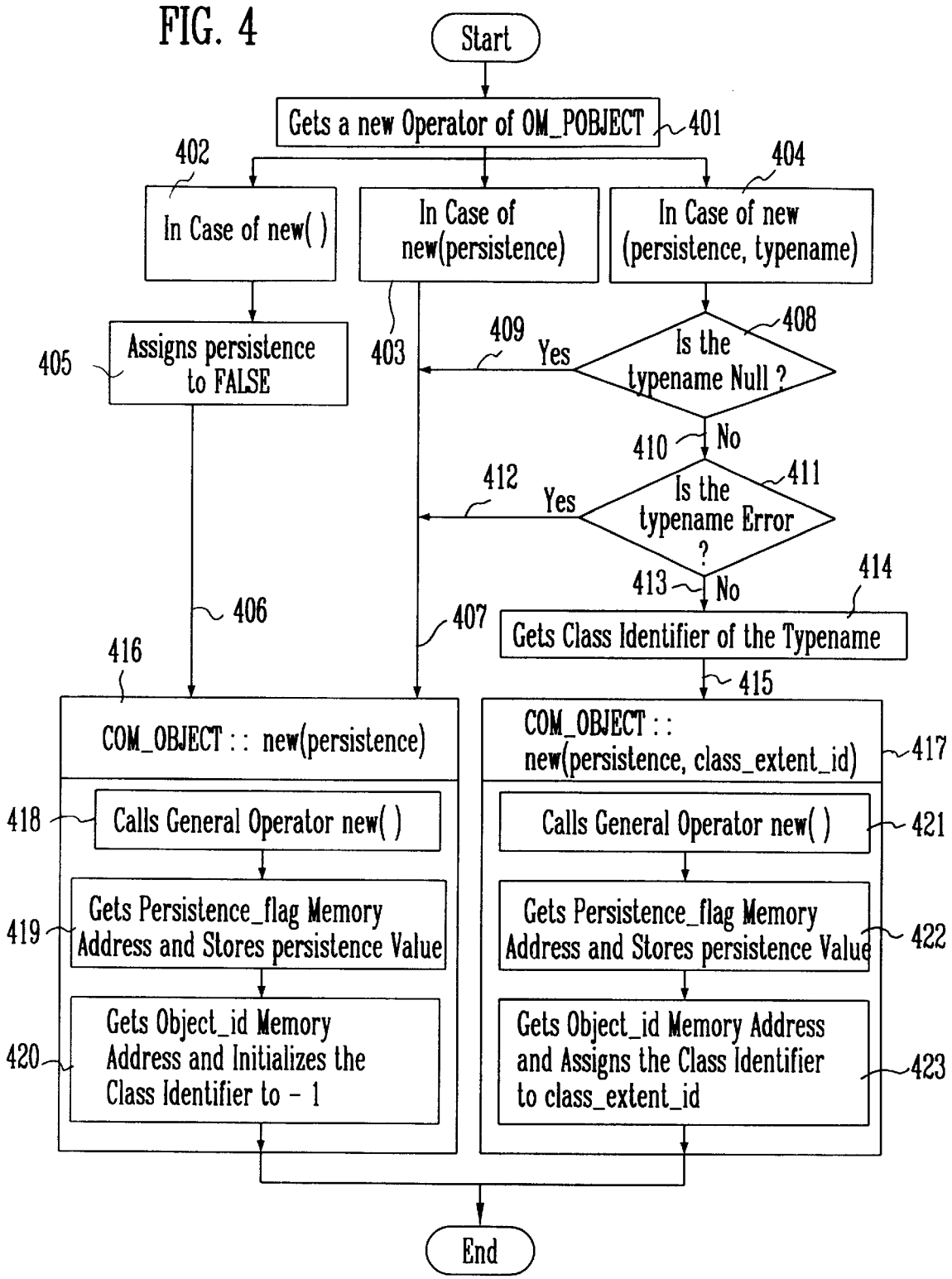
FIG. 4 is a flowchart for illustrating the operation of persistence object creation operator new( ) defined in OM_POBJECT used in the present invention.

FIG. 4 is a flow chart for illustrating the operation of persistence object creation operator new( ) defined in OM_POBJECT used in the present invention.

The operator new( ) of OM_POBJECT calls therein the operator new( ) of COM_OBJECT class as follows. In step 401, OM_POBJECT::operator new( ) 402 having no parameters calls COM_OBJECT::operator new(FALSE) 405 and 406, and OM_POBJECT::operator new(persistence) 403 having only one persistence parameter calls 407 COM_OBJECT::operator new(persistence) 416. OM_POBJECT::operator new (persistence, typename) 404 having two parameters, persistence and typename, calls 407 COM_OBJECT::operator new(persistence) 416 if the typename is null 409 or if it is not a persistence class which has been already created at the database system 412 according to typename 408 and 411, and if not 410 and 413 it gets 414 class identifier of the class corresponding to the typename to call 415 COM_OBJECT::operator new(persistence, class_extent_id) 417.

From the above procedure, the operating flow of COM_OBJECT::operator new(persistence) proceeds as follows.

First, it allocates 418 necessary memory as needed by using the general operator new( ) that is provided by the programming system. Then it gets Persistence_flag memory address of COM_OBJECT structure by corresponding it to when the allocated memory has COM_OBJECT structure and then stores persistence value provided as an input to the Persistence_flag memory area 419. Next, it gets Object_id memory address of COM_OBJECT structure by corresponding it to when the allocated memory has COM_OBJECT structure, and then gets the address of the class identifier location from Object_id memory area to initialize it to −1 420.

Also, the operating flow of COM_OBJECT::new (persistence, class_extent_id) proceeds as follows.

First, it allocates 421 necessary memory as needed by using the general operator new( ) that is provided by the programming system. Then it gets Persistence_flag memory address of COM_OBJECT structure by corresponding it to when the allocated memory has COM_OBJECT structure and then stores persistence value provided as an input to the Persistence_flag memory area 422. Next, it gets Object_id memory address of COM_OBJECT structure by corresponding it to when the allocated memory has COM_OBJECT structure, and then gets the address of the class identifier location from Object_id memory area to store the class_extent_id value provided as an input therein 423.

Figure 5:
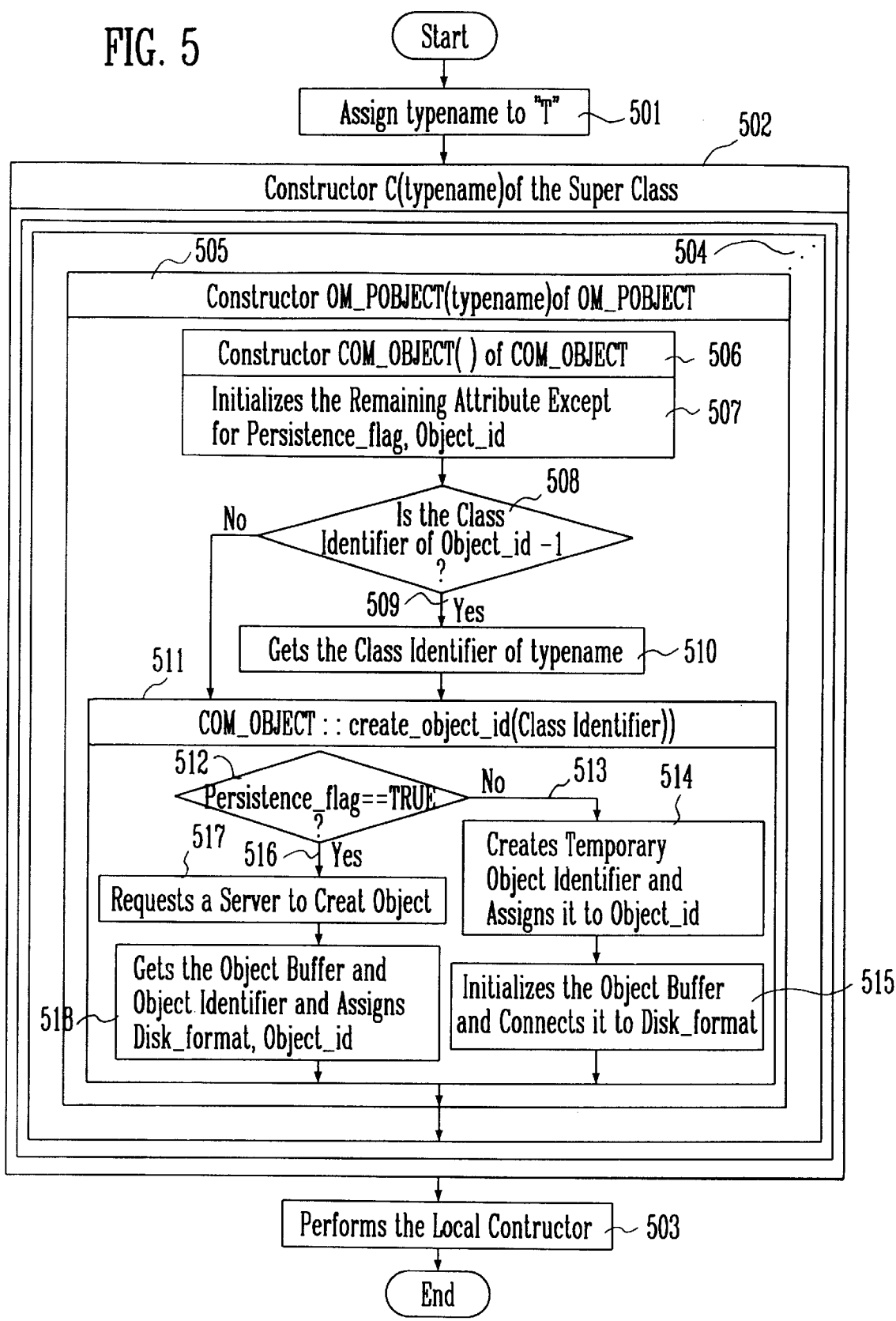
FIG. 5 shows a flowchart for constructor of the class called T which is a persistence class used in the present invention.

FIG. 5 shows a flow chart for constructor of the class called T which is a persistence class used in the present invention.

The T( ) constructor first assigns typename as its name 501, calls constructor C(typename) for a direct super class 502, and then performs the contents of itself constructor 503. The super class in turn calls constructor C(typename) for a direct super class. Then it is repeated 504, thereby OM_POBJECT(typename) is finally called 505. Here, if it is a T class, typename becomes "T". A first class name. that is, "T" is transmitted to the constructor of the last OM_POBJECT, resulting in finally creating objects belonging to T.

In the above, OM_POBJECT(typename) 505 performs local constructor contents after calling COM_OBJECT( ) constructor. COM_OBJECT( ) constructor 506 initializes 507 the remaining attributes except for Persistence_flag and Object_id location for which their values are substituted in new operator. OM_POBJECT(typename) itself constructor checks a class identifier of Object_id 508. Then, if any value is not substituted for the class identifier(that is, in case of −1) 509, it uses a provided typename to get a class identifier 508 and then to create objects 511. However, if the class identifier is not −1, it uses a corresponding class identifier to create objects (COM_OBJECT::create_object_id(class identifier) call) 511.

COM_OBJECT::create_object 511 creates a temporary object or a persistence object according to Persistence_flag 512. If Persistence_flag is FALSE 513, it sets a temporary object identifier to Object_id 514, it makes an object buffer set to a default value and connect it to Disk_format 515. If Persistence_flag is TRUE 516, it requests a server to create objects 517, connect the object buffer received from the server to Disk_format, and then gets an object identifier to substitute it for Object_id 518.

From the above, the present invention requires the interface of T( ) and T(typename) as constructor of persistence class and the implementation of the constructors, as explained above. Therefore, since the constructor interface and its implementation are generated in a class header file by using a class definition statement creation tool, it makes the user using it without noticing it.

As described above, since the present invention provides a method of providing persistence to a C++ application program object, it allows tp create a persistent objects in a C++ application program as the same concept to that to create general C++ object. Also, the object can be created though the class name to which the objects belong is not explicitly provided. So the present invention can provide easiness of use and consistency to the users. Additionally, since the present invention makes possible persistence object creation even without class definition for the class structure information, it can be used even in an application program where to get class definition sentence in advance is difficult.

While the present invention has been described and illustrated herein with reference to the preferred embodiment thereof it will be understood by those skilled in the art that various changes in form and details may be made therein without departing from the spirit and scope of the invention.

What is claimed is:

1. A method of providing persistence to objects which are created in a C++ application program, comprising the steps of:
   overloading an object creation operator (new( )) into a persistent capable class (OM_POBJECT) as a C++ application program interface of an object oriented database system to use:
   an object creation operator without parameters(OM_POBJECT::new( )),
   an object creation operator having persistents as parameters (OM_POBJECT::new (persistence)),
   an object creation operator having persistence and typename (OM_POBJECT::new (persistence, typename); and
   using a step of the overloaded persistence object creation operator and a step of the constrictor to support the said interface.

2. A method of providing persistence to objects in a C++ application program as claimed in claim 1, wherein said of operating the constructor function, comprising the steps of:
   assigning the typename of T( ) constructor to "T";
   calling a constructor C(typename) of a direct super class of the class; and
   performing itself constructor to finish this step.

3. A method of providing persistence to objects in a C++ application program as claimed in claim 2, wherein said step of operating the constructor of the super class, comprising the steps of;
   calling C(typename) for a direct super class and then repeated calling it; and
   finally calling constructor function OM_POBJECT (typename) of persistent capable class(OM_POBJECT).

4. A method of providing persistence to objects in a C++ application program as claimed in claim 3, wherein said step of operating the construct function(OM_POBJECT (typename)), comprising the steps of:
   calling the constructor function(COM_OBJECT( )) of the persistence management class (COM_OBJECT);
   initializing the remaining attributes except persistent flag and object identifier in the said called constructor function (COM_OBJECT( )); and
   confirming whether the class identifier of object identifier equals −1 or not in the said constructor function(OM_POBJECT(typename)) itself as a result of said confirmation, if it is −1, obtaining the class identifier of the typename, calling the object identifier creation function (COM_OBJECT:: create_object_id (class identifier)) of the persistence management class, otherwise, if it is not −1, then directly calling the object identifier creation function of the persistence management class.

5. A method of providing persistence to objects in a C++ application program as claimed in claim 4, wherein said step of operating the object identifier creation function (COM_OBJECT ::create_object_id (class identifier)) of the persistence management class comprising the steps of;
   confirming whether the persistence flag(Persistence_flag) is TRUE or FALSE;
   as a result of said confirmation, if it is FALSE, creating temporary objects identifier to assign it to an object identifier(Object_id) attribute, and initializing an object buffer to default value and connect it to a disk format attribute(Disk_Format); and
   as a result of said confirmation, if it is TRUE, requesting the server to create object, connecting the object buffer obtained from the server to the disk format(Disk_Format) attribute, obtaining an object identifier to substitute it to the object identifier(Object_id) attribute.

6. A method of providing persistence to objects in a C++ application program as claimed in claim 1, wherein said step of operating the persistence object creation operator of the persistent capable class(OM_POBJECT), comprising the steps of:

receiving the object creation operator of the persistent capable class by a program system to confirm its parameter;

as a result of said confirmation, if it is the object creation operator(OM_POBJECT:: new( )) having no parameters, assigning persistence in the object creation operator(COM_OBJECT::new(persistence)) having persistent parameter of the persistence management class(COM_OBJECT) to be FALSE, calling it and finishing this step;

as a result of said confirmation, if it is the object creation operator(OM_POBJECT ::new(persistence)) having one parameter representing persistence. calling the object creation operator(COM_OBJECT::new (persistence)) having persistent parameter of the persistence management class with the given parameter value and finishing this step;

as a result of said confirmation, if it is the object creation operator(OM_POBJECT ::operator new (persistence, typename)) having two parameters, persistence and typename, confirming whether the typename is null or not;

as a result of said confirmation, if the type name is null, calling the object creation operator (COM_OBJECT::new(persistence)) having persistence parameter of the persistence management class, and if the type name is not null, then confirming whether the typename is wrong or not; and as a result of said confirmation, if the typename is wrong, calling the object creation operator(COM_OBJECT::new(persistence)) having persistence parameter of persistence management class, otherwise, if the typename is not wrong, then getting the class identifier of the typename to call the object creation operator (COM_OBJECT::new(persistence, class_extent_id)) having class-extent-id and persistence parameters of the persistence class and to finish this step.

7. A method of providing persistence to objects in a C++ application program as claimed in claim 1, wherein said step of operating the object creation operator (COM_OBJECT::new (persistence)) having persistence of said persistence management class, comprising the steps of:

calling general object creation operators;

obtaining a memory address of the persistence flag (Persistence_flag) being an attribute of the persistence management class to store persistence value given as an input; and getting a memory address of an object identifier(Object_id) attribute to initialize it to −1.

8. A method of providing persistence to objects in a C++ application program as claimed in claim 6, wherein said step of operating the object creation operator(COM_OBJECT::new (persistence, class_extent_id)) having persistence and class_extent_id parameters of the persistence management class, comprising the steps of:

calling general object creation operators;

getting a memory address of the persistence flag (Persistence_flag) being attribute of the persistence management class to store a persistence value provided as an input; and getting a memory address of object identifier(Object_id) attribute to assign a class identifier provided as an input.

* * * * *